United States Patent
Sweeney

(10) Patent No.: US 9,292,780 B2
(45) Date of Patent: *Mar. 22, 2016

(54) CONTROLLABLE RFID CARD

(71) Applicant: Philip Morris USA Inc., Richmond, VA (US)

(72) Inventor: William R. Sweeney, Richmond, VA (US)

(73) Assignee: PHILIP MORRIS USA INC., Richmond, VA (US)

( * ) Notice: Subject to any disclaimer, the term of this patent is extended or adjusted under 35 U.S.C. 154(b) by 17 days.

This patent is subject to a terminal disclaimer.

(21) Appl. No.: 14/095,411

(22) Filed: Dec. 3, 2013

(65) Prior Publication Data

US 2014/0091143 A1    Apr. 3, 2014

Related U.S. Application Data

(63) Continuation of application No. 11/049,861, filed on Feb. 4, 2005, now Pat. No. 8,624,740.

(51) Int. Cl.
| | |
|---|---|
| *G08B 13/14* | (2006.01) |
| *G06K 19/07* | (2006.01) |
| *G06K 19/073* | (2006.01) |
| *G06K 19/077* | (2006.01) |
| *G06Q 30/02* | (2012.01) |

(52) U.S. Cl.
CPC ...... *G06K 19/0723* (2013.01); *G06K 19/07345* (2013.01); *G06K 19/07703* (2013.01); *G06Q 30/02* (2013.01)

(58) Field of Classification Search
USPC .................. 235/380, 379; 340/572.7, 572.4
See application file for complete search history.

(56) References Cited

U.S. PATENT DOCUMENTS

| | | |
|---|---|---|
| 4,002,886 A | 1/1977 | Sundelin |
| 4,099,247 A | 7/1978 | Mikada et al. |
| 4,339,668 A | 7/1982 | Mueller et al. |
| 4,390,877 A | 6/1983 | Curran |
| 4,766,295 A | 8/1988 | Davis et al. |
| 4,841,429 A | 6/1989 | McClanahan et al. |

(Continued)

FOREIGN PATENT DOCUMENTS

| | | |
|---|---|---|
| AU | 199923699 | 10/2000 |
| EP | 0 568 067 A1 | 11/1993 |

(Continued)

OTHER PUBLICATIONS

Kleper, M. et al., "Advanced Display Technologies—An Investigation of the Emerging and Developing Technologies Related to the Generation Beyond Print-on-Paper", Rochester Institute of Technology, No. PICRM-2003-07, pp. 1-24 (Oct. 2003).

*Primary Examiner* — Daniel Hess
(74) *Attorney, Agent, or Firm* — Buchanan, Ingersoll & Rooney PC

(57) ABSTRACT

Systems and methods for providing personalized information are provided. Based on an identification of a customer through the use of a card, personalized information is selectively produced and wirelessly provided to a display such as a wireless display. The identification of the customer, as well as additional information, can be provided through the use of the card, wherein functions of the card can be enabled or disabled by the customer through the use of on-card switches, buttons, slides and/or bistable domes.

20 Claims, 5 Drawing Sheets

(56) References Cited

U.S. PATENT DOCUMENTS

| | | | |
|---|---|---|---|
| 4,888,709 | A | 12/1989 | Revesz et al. |
| 4,942,352 | A | 7/1990 | Sano |
| 5,111,196 | A | 5/1992 | Hunt |
| 5,181,131 | A | 1/1993 | Yamazaki et al. |
| 5,198,644 | A | 3/1993 | Pfeiffer et al. |
| 5,402,104 | A | 3/1995 | LaRosa |
| 5,455,466 | A | 10/1995 | Parks et al. |
| 5,510,602 | A | 4/1996 | Evans et al. |
| 5,537,126 | A | 7/1996 | Kayser et al. |
| 5,554,041 | A | 9/1996 | Lallement |
| 5,583,525 | A | 12/1996 | Nekomoto et al. |
| 5,648,761 | A | 7/1997 | Kreft et al. |
| 5,734,254 | A | 3/1998 | Stephens |
| 5,850,416 | A | 12/1998 | Myer |
| 5,870,067 | A | 2/1999 | Smith |
| 5,963,144 | A | 10/1999 | Kruest |
| 5,982,304 | A | 11/1999 | Selker et al. |
| 6,011,483 | A | 1/2000 | Tanaka et al. |
| 6,040,680 | A | 3/2000 | Toya et al. |
| 6,057,668 | A | 5/2000 | Chao |
| 6,097,301 | A | 8/2000 | Tuttle |
| 6,118,426 | A | 9/2000 | Albert et al. |
| 6,154,005 | A | 11/2000 | Hyogo et al. |
| 6,172,608 | B1 | 1/2001 | Cole |
| 6,343,744 | B1 | 2/2002 | Shibata et al. |
| 6,380,845 | B2 | 4/2002 | Tuttle |
| 6,401,074 | B1 | 6/2002 | Sleeper |
| 6,422,464 | B1 | 7/2002 | Terranova |
| 6,550,672 | B1 | 4/2003 | Tracy et al. |
| 6,690,264 | B2 | 2/2004 | Dalglish |
| 6,693,513 | B2 | 2/2004 | Tuttle |
| 6,714,133 | B2 | 3/2004 | Hum et al. |
| 6,726,099 | B2 | 4/2004 | Becker et al. |
| 6,760,017 | B1 | 7/2004 | Banerjee et al. |
| 6,760,804 | B1 | 7/2004 | Hunt et al. |
| 6,863,220 | B2 * | 3/2005 | Selker ............... 235/492 |
| 7,100,835 | B2 | 9/2006 | Selker |
| 7,221,900 | B2 | 5/2007 | Reade et al. |
| 7,270,276 | B2 | 9/2007 | Vayssiere |
| 7,283,036 | B2 | 10/2007 | Chen |
| 8,624,740 | B2 * | 1/2014 | Sweeney ............... 340/572.7 |
| 2001/0046126 | A1 | 11/2001 | Colello |
| 2002/0036569 | A1 | 3/2002 | Martin |
| 2002/0174025 | A1 | 11/2002 | Hind et al. |
| 2003/0009392 | A1 | 1/2003 | Perkowski |
| 2003/0018541 | A1 | 1/2003 | Nohr |
| 2003/0058110 | A1 | 3/2003 | Rich |
| 2003/0078840 | A1 | 4/2003 | Strunk et al. |
| 2003/0097302 | A1 | 5/2003 | Overhultz et al. |
| 2003/0115096 | A1 | 6/2003 | Reynolds et al. |
| 2003/0122655 | A1 | 7/2003 | Hum et al. |
| 2003/0227384 | A1 | 12/2003 | Sweeney et al. |
| 2003/0233288 | A1 | 12/2003 | Sweeney et al. |
| 2004/0002897 | A1 | 1/2004 | Vishik |
| 2005/0134461 | A1 | 6/2005 | Gelbman et al. |
| 2006/0071925 | A1 | 4/2006 | Wykoff et al. |
| 2006/0085266 | A1 | 4/2006 | Wei et al. |
| 2006/0175400 | A1 | 8/2006 | Sweeney et al. |
| 2006/0187040 | A1 | 8/2006 | Sweeney et al. |

FOREIGN PATENT DOCUMENTS

| | | | |
|---|---|---|---|
| WO | 93/16443 | A1 | 8/1993 |
| WO | 03/016803 | A1 | 2/2003 |

\* cited by examiner

CONTROLLABLE RFID CARD

BACKGROUND

The present invention relates to a controllable RFID (radio frequency identification) card.

SUMMARY

In accordance with exemplary embodiments, a system and method to present personalized information based on an identification of a customer is provided. Preferably, the system operates by acquiring identification information of a customer, using this acquired identification information to determine personalized information and providing the personalized information to a customer.

Additionally, the system preferably provides an identification card that can be read wirelessly for the identification information of a customer, but can also be manually controlled by a customer.

In another embodiment, a customer controllable identification card, comprises a card with first and second planar surfaces; at least one radio frequency identification tag within the card; and one or more controls located on the card, wherein the one or more controls extend beyond the first surface when positioned in an up direction and extend beyond the second surface in a down direction.

BRIEF DESCRIPTION OF THE DRAWING FIGURES

DETAILED DESCRIPTION

Figure 1:
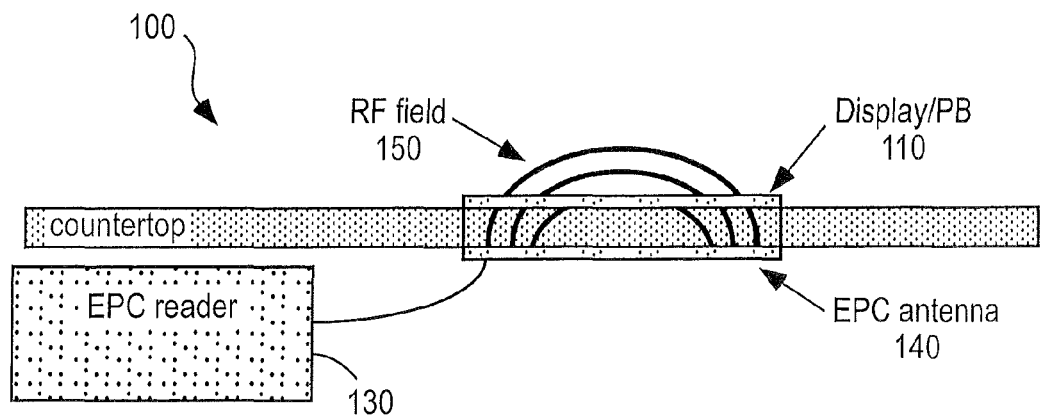
FIG. 1 illustrates a side perspective view portion of an exemplary system to present personalized information based on an identification of a customer.

A system and method to present personalized information based on an identification of a customer and/or a product is provided, wherein the system operates by: (A) acquiring identification information of a customer; (B) using this acquired identification information to determine personalized information; (C) providing the personalized information to a display screen; and (D) displaying the personalized information on the display screen of the system for viewing by the customer, wherein each of these operating steps is discussed below.

Additionally, display screens and card controllers are provided herein, wherein the display screens can display personalized information wirelessly and the card controllers can be controlled by a customer.

I. System Operation

A. Identification of a Customer and/or a Product

Identification of a customer and/or product is preferably provided by capturing an individual identification without customer interaction. Specifically, each customer can be provided with a card, wherein the card contains a mechanism which can be read wirelessly. The mechanism can be a radio frequency identification (RFID) tag.

In a preferred embodiment, RFID technology uses radio waves to automatically identify people. The RFID system includes a RFID tag which can include a memory chip attached to an antenna, and a RFID reader separate from the RFID tag which is used to read information from the RFID tag.

In general, the memory chip in the RFID tag is used to store a serial number, such as an EPC (electronic product code) or other information. An EPC is a product identification similar to the UPC (Universal Product Code) or barcode. Like the bar code, the EPC can be divided into numbers that identify a customer using a specific number for different manufacturers, products, versions or serial numbers. This EPC is embedded in a memory chip (smart tag) on individual products or cards, wherein each smart tag can be scanned by a wireless "reader," which transmits the product's embedded identity code to the Internet, intranet or other connections to where the "real" information on the product is transmitted from one location to another. That information can then be communicated to provide whatever information is needed about that product.

In the preferred embodiment, the "readers" or EPC readers use radio waves to "communicate" with RFID tags and gather EPCs. Through communication between the RFID tags and the EPC readers, a customer can be identified, wherein the EPC reader transmits one or more radio frequencies which can be modulated by the RFID tags, then the EPC reader receives the one or more modulated radio frequencies, wherein the received one or more modulated radio frequencies can be used to "read" an RFID tag and identify the customer.

RFID tags and EPC readers can be tuned to the same radio frequency in order to communicate with one another; however, multiple frequencies are available for RFID systems. Generally there are high frequencies ("HF," around 13.56 MHz), ultra-high frequencies ("UHF," around 850-950 MHz) and microwave frequencies (around 2.45 and 5.8 GHz) used with RFID systems. Additionally, there are near-field inductive communication frequencies (around 125 KHz) for use with wireless credit cards and the like. Thus, there are many options (near-field inductive or E-field capacitive and EM far-field coupling at several frequencies) for providing wireless power other than the power used for a main communications channel to a tag.

HF tags, UHF tags, combinations of HF and UHF tags and transceivers are used in a preferred system, where multiple RF power sources can be used simultaneously as desired, as discussed below, and multiple transceivers can be used for different ranges as discussed in U.S. Pat. No. 6,726,099, which is herein incorporated by reference in its entirety.

The wireless read fields, such as RF fields, can be either magnetic fields or electrical fields depending upon the type of RFID tags to be read. For inductively coupled RFID tags, the wireless read fields are magnetic fields, wherein the RFID tag receives the magnetic energy of the magnetic field and modulates the magnetic field. Next, the wireless information reader, such as an EPC reader, reads the modulated magnetic field to identify the RFID tag and the system correlates the identification of the RFID tag with a customer and/or product based upon previously stored information. Capacitively coupled RFID tags operate in a manner similar to the inductive coupled RFID tags except that the RFID tag modulates an electric field, and the modulated electric field is used to identify the RFID tag.

With respect to a wireless read field, situations may occur where there are more than one RFID tag is present in this field. However, it is desirable that the RFID and personalized information are based on at most one RFID tag corresponding to one customer, where each is most proximate to the system. To address these situations, exemplary embodiments employ logic which can detect the proximity of the read RFID tags. Specifically, based upon the strength of the signal read from the RFID tags, the system can determine that the strongest signal corresponds to the RFID tag(s) most proximate to the system.

Additionally, the system can employ a signal strength threshold to control how close an RFID tag must be before it is read and personalized information is displayed. For example, based upon routine testing it can be determined that a predetermined signal strength corresponds to a predetermined distance from a wireless information reader and a display. This predetermined distance is selected to ensure that the personalized information displayed is provided only to the intended recipient of the information.

B. Using Acquired Identification Information to Determine Personalized Information Using the acquired identification information, or EPC, from the EPC reader and RFID tag, allows for other information to be gathered in reference to the EPC. Preferably, the EPC works together with a Physical Markup Language (PML) and an Object Naming Service (ONS). PML is a new standard "language" for describing physical objects to the Internet in the same way that HyperText Markup Language (HTML) is the common language on which most Internet web sites are based. The ONS tells computer systems where to find information about any object that carries an EPC code, or smart tag. ONS is based in part on the Internet's existing Domain Name System (DNS), which routes information to appropriate web sites. The ONS will likely be many times larger than the DNS, serving as a lightening fast "post office" that locates data for every single one of trillions of objects carrying an EPC code.

The Physical Markup Language enables linking physical objects to each other, people and information through the Internet using Electronic tags, EPC, PML and ONS. Electronic tags refer to a family of technologies that transfer data wirelessly between tagged objects and electronic readers. Radio Frequency Identification (RFID) tags often have small radio antennas, which transmit data over a short distance.

The EPC was conceived as a means to identify physical objects. The EPC code was created to enumerate all objects and to accommodate current and future naming methods. The EPC code was intended to be universally and globally accepted as a means to link physical objects to the computer network, and to serve as an efficient information reference. The Object Naming Service (ONS) links the Electronic Product Code (EPC) with its associated data file. More specifically, the ONS is an automated networking service, which, when given an EPC number, returns a host address on which the corresponding data file is located. The ONS is based on the standard Domain Naming Service (DNS).

Finally, the Physical Markup Language (PML) can be used for describing and classifying objects in a PML file, where the information is thus kept away from the object label.

Therefore, a processor can connect to the Internet to communicate with the ONS, wherein the ONS can find a link corresponding to the EPC and transmit this link back to the processor, wherein the processor can follow the link and gather information in PML, which in turn can be sent back to the EPC reader.

Also, in accordance with exemplary embodiments, a web service can also be associated with the system, where a Bamboo/SQL (Structured Query Language) service (such as produced by ThingMagic), an Apache web server or other lightweight web service engine can be used to provide data to the system. Access to information from the Internet can be provided by a TCP/IP (Transmission Control Protocol/Internet Protocol) protocol stack with an authentication cryptographic component in a conventional manner.

C. Providing the Personalized Information to a Display Screen of the System for Viewing by the Customer The EPC reader can provide personalized information to a display screen through transmitting data of the personalized information through the electromagnetic radiation field, as mentioned above. The data for display can be transmitted using various formats, such as ASCII text, HTML, XML, mobile code, such as Java, bitmaps or compressed bitmap structures such as simple run length encoding or JPEG encoding. Data for the system can be transferred using conventional XML constructs such as those in the EPC PML standard, as mentioned above, and others. The data can also be encrypted and the components can be verified for communication via passwords or other authentication methods.

II. Card Controller

Also, as mentioned above, the system preferably provides a card that can be read wirelessly for identification or other information, but can also be controlled by a customer. Thus, a customer can customize a card to provide information and personal preferences to a card reader system.

A preferred embodiment of a card that can be read contains a RFID tag, as well as controls on the card for a customer to modify. As illustrated in FIG. 1, a system 100 is provided for acquiring identification information of a customer, and then personalizing information based on the identification information for display on a display screen 110. This is accomplished by providing a system 100 in communication with a wireless information reader, such as an EPC (electronic product code) reader 130, and a display screen 110, wherein if a card is brought within the RF (radio frequency) field 150, information from the card can be read. A wireless information reader, such as the EPC reader 130, can be provided, wherein radio waves can be transmitted by an antenna, such as an EPC antenna 140 as illustrated in FIG. 1. The radio waves can be in the form of an electromagnetic field, such as a RF field 150, which as illustrated in FIG. 1, can be provided in front of a display screen 110, to communicate with RFID tags to acquire EPCs.

Figure 2:
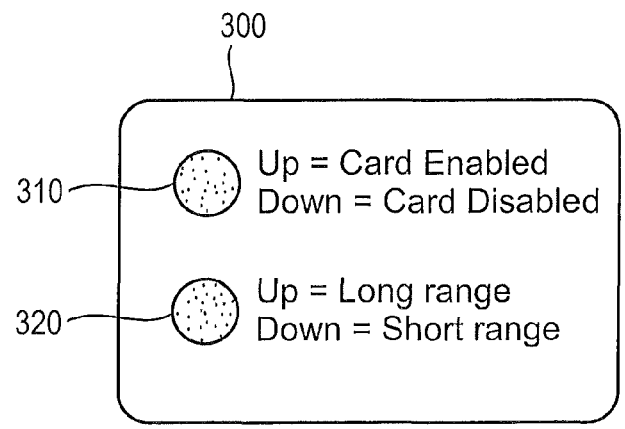
FIG. 2 illustrates a front view of an embodiment of a customer controlled card.
Figure 3:
FIG. 3 illustrates a side view of an embodiment of a customer controlled card.

In one embodiment, as illustrated in FIGS. 2 and 3, one or more controls 310 can be provided along an exterior surface of an RFID containing card 300. By providing controls on a card, a customer can use the card itself to provide preferences to the card reader. Therefore, the cards can be customized at the point of use and, if desired, functions of the card can be enabled or disabled depending on the customer at the point of use.

Preferably, the cards can be customized through the use of controls 310. Preferably, the controls 310 are provided in the form of switches, slides, buttons and/or domes. Controls 310 are preferably provided in these forms to provide tactile and visual feedback and confirmation of customer's selections. For example, as illustrated in FIGS. 2 and 3, exemplary controls 310 can be provided in the form of bistable inverting dome switches (hereinafter "bistable domes"), which are illustrated in a front perspective view in FIG. 2 and a side perspective view in FIG. 3.

It is noted that switches, slides and/or buttons may also be preferable as they can be used to provide similar advantages to the bistable domes with different tactile and/or visual feedback and different physical mechanisms that may be more preferable depending upon the application. Additionally, it is noted that while the controls 310 can be stable, binary controls or switches, such as the exemplary bistable domes illustrated, the controls 310 can also be momentary contact switches, wherein the state of the control can be stored electronically with or without visual or tactile feedback.

As illustrated in FIG. 2, bistable dome controls 310 can be used to provide tactile and/or visual feedback to a user and can be up or down, wherein for example, up can enable a feature of the card, while down can disable a feature of the card.

Figure 4A:
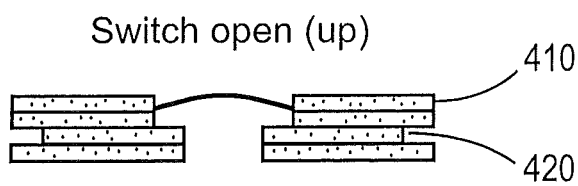
FIGS. 4A-4E illustrate exemplary embodiments of a customer controlled card.
Figure 4B:
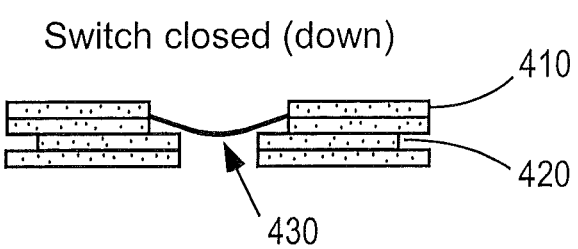

The exemplary bistable domes, as well as other switches, slides and/or buttons, can be used as bimodal switches to activate or deactivate a circuit. As illustrated in FIGS. 4A-4B, examples of these types of switches are provided, wherein a switch can be opened, or deactivated, in an "up" position so that the conductive dome 430 is away from a conductor 420. Alternatively, the switch can be closed in a "down" position, where a conductive dome 430 can be placed in contact with a conductor 420 thus activating the circuit.

Figure 4C:
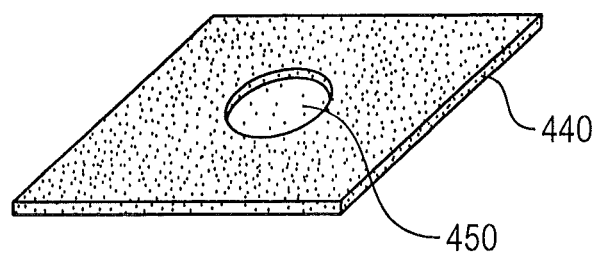

In order to provide tactile and/or visual feedback to a user, a card 440 with an open area 450 can be provided, as illustrated in FIG. 4C, wherein the open area 450 can allow a user to touch or feel the bistable dome control whether it is concave or convex therein.

Figure 4D:
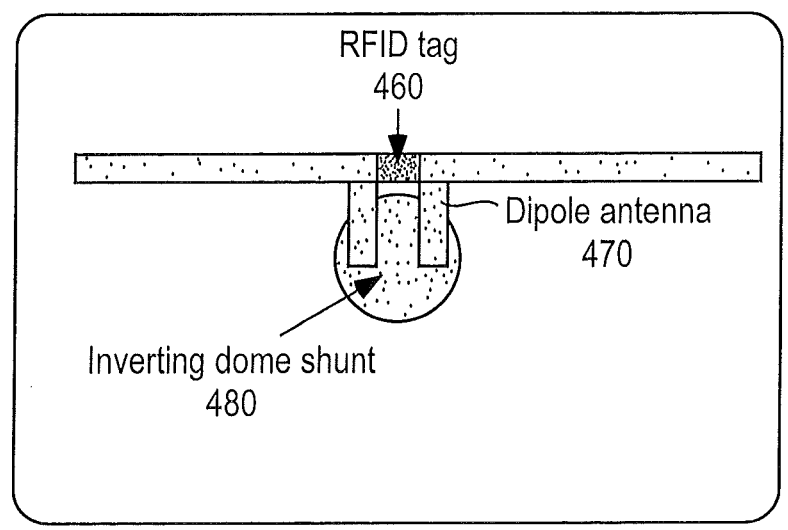
Figure 4E:

In an embodiment, as illustrated in FIG. 4D, a RFID tag 460 can be placed within a switch circuit 470, wherein the RFID tag 460 can be activated or deactivated by a switch, as illustrated in FIGS. 4A and 4B, such as by an inverting dome shunt 480. Thus, a RFID tag 460 can be made available or unavailable simply by opening or closing a switch by pushing on one side or the other side of the opening area 450 in which the inverting dome shunt 480 is located.

Figure 5:
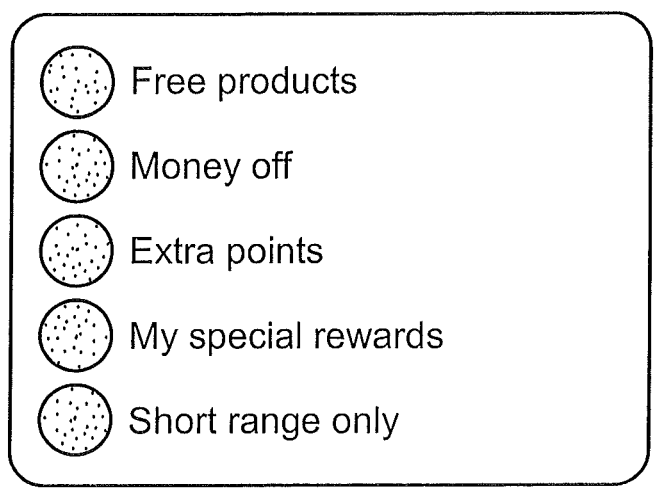
FIG. 5 illustrates an exemplary embodiment of multiple controls on a card.

The controls 310 can provide independent operations of different aspects of the card as desired. For example, as illustrated in FIG. 2, a first control 310 can be to enable/disable the card, while a second control 320 can be to selectively determine the perimeter range for the card, e.g., long range or short range. Alternatively, as illustrated in FIG. 5, for example, multiple controls can be used to set promotion preferences for reading in a grocery store, or to play a game of chance, similar to bingo, wherein a user can push down several bistable dome controls, while pushing up other bistable dome controls to create a pattern. It is noted that while bistable dome controls are illustrated in FIG. 5, other switches, slides and/or buttons may also be used to create a pattern on the card. Thus, by providing controls to a customer, attributes of the card can be modified, wherein the provision of the controls along an external surface makes such modifications easily accessible to the customer.

Figure 6A:
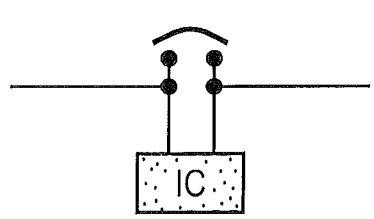
FIGS. 6A-6F illustrate exemplary control circuits and exemplary tactile/visual feedback domes.
Figure 6B:
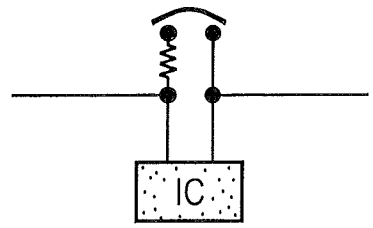
Figure 6C:
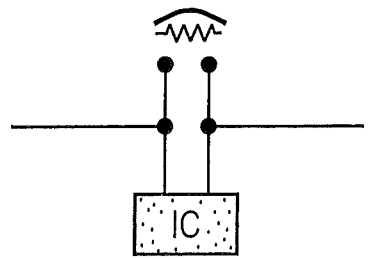

The controls 310 can operate as mentioned above by activating or deactivating a switch, which can encompass several alternative means for operating the controls 310. For example, as illustrated in FIG. 6A, the circuit can be provided with a simple shorting mechanism, where the circuit is controlled through contact or lack of contact between the contact bridge 610 and the circuit 620. Alternatively, a switched resistor can be used, for example as illustrated in FIG. 6B, in a range adjustment circuit, wherein the contact bridge 610 is either in contact or not in contact with a resistor containing circuit 630. As another alternative, a resistive dome 640, as illustrated in FIG. 6C, can be used in addition to the contact bridge 610 and the circuit 620 of FIG. 6A, wherein the resistive dome 640 can provide a range adjustment circuit similar to FIG. 6B.

Figure 6D:
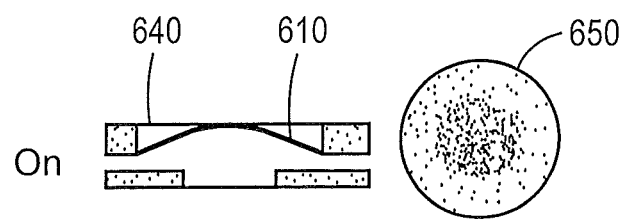
Figure 6E:
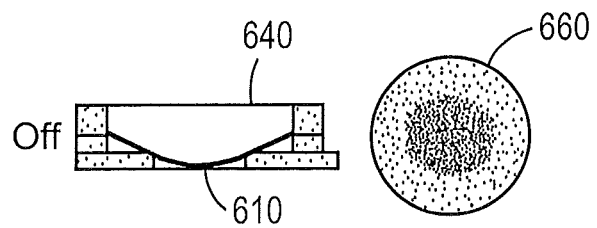

The controls 310 can also include a visual display indicator 640, as illustrated in FIGS. 6D and 6E, on one or both sides of the controls 310. By providing a visual display indicator 640, a customer could be able to visually affirm the status of the controls 310. Preferably, the visual display indicator 640 is a translucent indicating membrane 640 capable of altering appearance when in contact with a portion of the control 310. For example, as illustrated in FIGS. 6D and 6E, a translucent indicating membrane 640 in contact with a top portion of a contact bridge 610 would appear in top view 650 as a lighter colored membrane, while a top view 660 of the contact bridge 610 while not in contact with the translucent indicating membrane 640 would appear in top view 660 as a darker colored membrane.

Figure 6F:
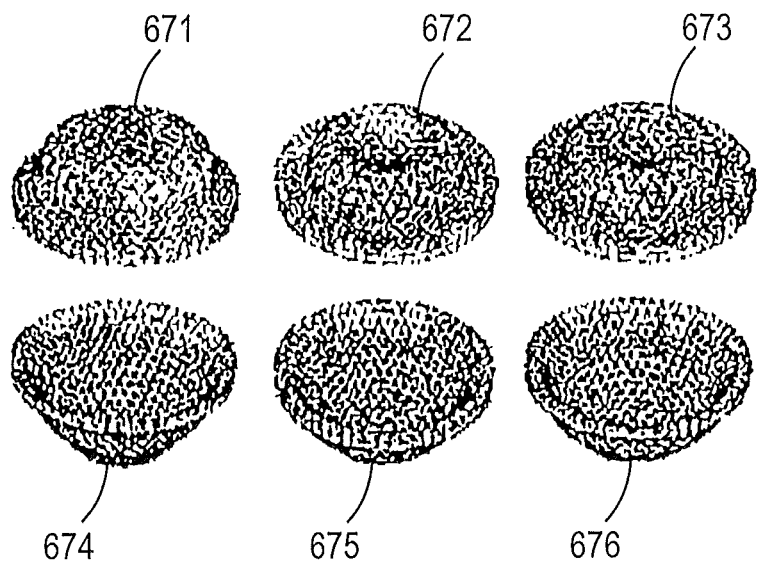

The controls 310 can also be provided with tactile feedback in addition to visual feedback. The tactic feedback can be provided in numerous shapes, for example, as illustrated in FIG. 6F, wherein the surface of the controls 310 can have a solid surface 671, a dome with different shaped recess, therein 672, 673, different shaped cones 674, 675, 676 or other tactile feedback providing shapes.

Controls for devices have also been discussed in U.S. Pat. No. 5,982,304 and U.S. Patent Application Nos. 2002/0140546 A1, 2003/0132301 A1 and 2001/0043141 A1, which are herein incorporated by reference in their entireties.

III. Examples

In an exemplary embodiment, a cigarette kiosk can be supplied with an exemplary display system, wherein a display screen can be added to a kiosk and can be used to display personalized information to a customer. For example, a customer can customize a card containing a RFID tag by selectively changing controls on the card to represent the customer's desires for information. The card can then be read by an EPC reader of the system when the card enters a RF field produced by the EPC reader. Next, the EPC reader can gather personalized information based on an EPC read from the RFID tag by the EPC reader.

After the personalized information is gathered by the EPC reader, the EPC reader can then transmit data through the RF field to the display screen. Thus, with the display screen located in the RF field, the display screen can display the personalized information data using the data and power from the EPC reader. Therefore, by using the customer controlled RFID tag containing card in conjunction with the wireless display system, personalized information along with power can be transmitted through a RF field to the wireless display, wherein the wireless display screen can wirelessly display the personalized information.

In another exemplary embodiment, a wireless display system and a customer controlled RFID tag card can be provided for use in pattern recognition applications, wherein a customer can control the individual's card to create a pattern that the system can recognize and answer. For example, the card can be provided with multiple bistable dome controls, as mentioned above, wherein a user can depress some of the bistable dome controls while leaving other bistable dome controls not depressed to create an individual pattern. Then, the individual pattern in conjunction with the RFID tag in the card can be brought within a RF field of an EPC reader, wherein the pattern of the bistable domes and the RFID tag can be read. Next, the pattern of the bistable domes and the RFID tag can be compared to predetermined information, and an answer can be given. For example, the system can be used as a game of chance, wherein if matches between the pattern and the predetermined information are found, then notification of winning can be given to the customer.

The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of displaying personalized information, comprising:
   providing, by an information reader device, an electromagnetic radiation field;
   reading, by the information reader device and from an identification card or tag, identification information stored on the identification card or tag using the electromagnetic radiation field;
   retrieving, via a network, personalized information corresponding to the identification information read from the identification card or tag;
   transmitting the personalized information, by the information reader device and via the electromagnetic radiation field, to a display screen, wherein the display screen is powered by the electromagnetic radiation field; and
   displaying the personalized information on the display screen.

2. The method of claim 1, wherein the identification information is read from a card with at least one control, wherein the control enables or disables a function of a card, and wherein information on the card is read by the information reader device.

3. The method of claim 1, wherein the card comprises a smart card.

4. The method of claim 3, wherein the smart card comprises an RFID tag.

5. The method of claim 3, wherein the at least one control comprises a switch, a slide, a button, a bistable inverting dome and/or a momentary contact switch.

6. The method of claim 1, wherein the card comprises multiple controls.

7. The method of claim 1, wherein the at least one control comprises a tactile or visual response display on the card.

8. The method of claim 1, wherein the system comprises a cigarette sales promotion system, a consumer buying pattern recognition system, a game of chance system, or an electronic price display system.

9. The method of claim 1, wherein the information reader receives information from the card identifying a customer.

10. The method of claim 1, wherein the information reader reads an electronic product code from a microchip in the card, transmits the electronic product code through a processor to the internet or an intranet and receives display information through the processor corresponding to the card.

11. The method of claim 1, wherein the card includes:
    first and second planar surfaces;
    at least one radio frequency identification tag within the card; and
    one or more controls located on the card, wherein the one or more controls are configured to selectively enable or disable radio frequency readable functions of the card.

12. The method of claim 11, wherein the one or more controls extend beyond the first planar surface when positioned in an up direction and extend beyond the second planar surface in a down direction.

13. The method of claim 11, wherein the one or more controls are switches, slides, buttons, bistable domes and/or momentary contact switches.

14. The method of claim 11, wherein the one or more controls are physically movable on a surface of the card.

15. The method of claim 11, wherein the one or more controls enable a user of the card to interactively communicate with a card reader via an electromagnetic field.

16. The method of claim 11, wherein a control of the one or more controls is configured to selectively determine an RF perimeter range for the card.

17. The method of claim 11, wherein at least one control of the one or more controls is configured to enable interactive communication with a card reader at the point of use.

18. The method of claim 11, wherein at least one control of the one or more controls is configured to provide tactile feedback or visual feedback based on a selection state.

19. The method of claim 1, wherein the information reader device is an RFID reader, the read identification card or tag is one of a plurality of identification cards or tags within a range of the RFID reader and the method further comprises a step of determining that the identification card or tag is closest in proximity to the RFID reader.

20. The method of claim 1, further comprising steps of:
    determining, a signal strength of the identification card or tag; and
    comparing the determined signal strength to a predetermined signal strength threshold.

* * * * *